(12) United States Patent
Bowman et al.

(10) Patent No.: US 6,470,991 B1
(45) Date of Patent: Oct. 29, 2002

(54) TRACTOR WITH FRONT SUSPENSION

(75) Inventors: Dennis Aaron Bowman, Cedar Falls; Christopher Alan Schafer, Traer; Dennis Lee Jeffries, Waterloo; Jeffery Kahle Brown, Cedar Falls, all of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/661,855

(22) Filed: Sep. 14, 2000

(51) Int. Cl.[7] .......................... B62D 21/00; B62D 7/00; B60G 7/00; B60P 7/00
(52) U.S. Cl. ................................ 180/312; 280/124.109
(58) Field of Search ........................ 280/785, 124.109, 280/124.135, 124.136, 781, 788; 180/312, 371

(56) References Cited

U.S. PATENT DOCUMENTS

| | | | | |
|---|---|---|---|---|
| 1,781,206 A | * | 11/1930 | Wright ................. | 280/124.136 |
| 2,696,388 A | * | 12/1954 | Kishline et al. ...... | 280/124.135 |
| 2,876,018 A | * | 3/1959 | Kishline et al. ...... | 280/124.135 |
| 2,901,051 A | | 8/1959 | Thibodeau | |
| 3,283,842 A | | 11/1966 | Watt | |
| 4,786,075 A | * | 11/1988 | Takahashi .................... | 280/696 |
| 4,811,970 A | * | 3/1989 | Cassese ....................... | 180/312 |
| 4,964,651 A | * | 10/1990 | Kubo .................. | 280/124.109 |
| 5,382,044 A | * | 1/1995 | Smith et al. ................. | 280/673 |
| 5,513,874 A | * | 5/1996 | Mori ........................... | 280/666 |
| 5,538,264 A | | 7/1996 | Brown et al. ................. | 280/6.1 |
| 5,538,274 A | * | 7/1996 | Schmitz et al. ............. | 280/666 |
| 5,820,150 A | * | 10/1998 | Archer et al. ......... | 280/124.136 |
| 5,879,016 A | | 3/1999 | Altherr et al. ........ | 280/124.112 |
| 5,931,486 A | | 8/1999 | Andreis | |
| 5,938,219 A | * | 8/1999 | Hayami et al. ....... | 280/124.135 |
| 6,250,415 B1 | * | 2/2000 | Seto ........................... | 180/337 |
| 6,116,627 A | * | 9/2000 | Kawabe et al. ....... | 280/124.135 |
| 6,138,786 A | * | 10/2000 | Anderson et al. ........... | 180/312 |
| 6,167,980 B1 | * | 1/2001 | Anderson et al. ........... | 180/312 |

FOREIGN PATENT DOCUMENTS

| | | |
|---|---|---|
| DE | 199 52 313 A1 | 5/2000 |
| JP | 63 258206 A | 10/1988 |

OTHER PUBLICATIONS

John Deere 8000/8000T Series Tractor Brochure, dated Sep. 1998, printed in U.S.

* cited by examiner

*Primary Examiner*—Paul N. Dickson
*Assistant Examiner*—Joselynn Y Sliteris

(57) ABSTRACT

A tractor with a front wheel suspension and mechanical front wheel drive wherein the front wheel drive differential case includes an engine oil sump replacing the need for a separate engine oil sump and wherein the suspension control arms are mounted to the differential case through integrally formed mounting structures in the differential case. These mounting structures reduce the number of front end components thereby improving the packaging of the suspension, steering and front wheel drive. The elimination of the oil: pan allows the front axle ground clearance to be increased while improving ground visibility in front of the tractor over the hood.

14 Claims, 4 Drawing Sheets

TRACTOR WITH FRONT SUSPENSION

BACKGROUND OF THE INVENTION

1. Field of the Invention

The present invention relates to a tractor with a front suspension and particularly to a tractor where the front suspension components are mounted directly to a mechanical front wheel drive differential case.

2. Description of Related Art

To improve tractor performance, front axle suspension systems are becoming more commonplace. A front suspension provides improved operator comfort, thereby reducing operator fatigue. In addition, the tractor frame is subjected to less impact loading during operation. A front suspension axle, however, adds complexity and additional components to the front axle.

To further improve the performance of agricultural tractors, many tractors are provided with mechanical front wheel drive. While the front wheels and tires are typically smaller than the rear, by driving both the rear and the front wheels, tractive efficiency is improved. A mechanical front wheel drive requires a front drive axle with considerably more components compared to a front axle without front wheel drive.

Many competing design requirements make it difficult to package front wheel drive and a front axle suspension in a tractor. These design requirements include: ground visibility over the hood; high crop clearance; and a small turning radius. These requirements place a premium on space at the front axle, especially with front wheel drive and a front wheel suspension.

SUMMARY OF THE INVENTION

The tractor of the present invention overcomes the packaging difficulties described above by integrating the engine oil pan into the mechanical front wheel drive differential case and by integrating the suspension mounting bosses into the differential case casting. The integration of the oil pan into the differential case eliminates the need for a separate oil pan and the vertical packaging space needed for the pan. This enables both the crop clearance and the front ground visibility over the hood to be improved.

The differential case itself is an integral part of the tractor frame. There are no frame members extending longitudinally of the tractor along side or beneath the engine. The differential case is the frame. While the engine oil pan has previously been integrated into the tractor frame, the front drive axle has been a beam structure in which the front differential is part of a pivoting axle beam. This front beam axle is pivotally mounted to the frame about a longitudinal axis but it is not suspended from the frame.

The integration of the suspension mounting bosses into the differential case casting reduces the number of components needed to attach the suspension system control arms to the vehicle structure, in this instance, the differential case. By eliminating components, more space is available for the suspension arms, the drive shaft, the steering cylinder and tie rods.

The suspension system is an independent suspension having upper and lower control arms on each side of the differential case extending outward to steering knuckles that support final drive assemblies. The left and right sides of the suspension system are mechanically independent from one another. The left and right sides are coupled through a common gas accumulator providing fluid pressure to hydraulic cylinders on each side of the suspension.

A steering cylinder is also carried by the differential case having a cylinder rod extending from both sides of the differential case to which tie rods are attached and extend to the steering knuckles. The upper control arm has an inboard end attached to a mounting boss projecting laterally outward from the differential case. The inboard end of the upper control arm is:forked, having two spaced apart legs that are placed on opposite sides of the mounting boss. A single pivot pin extends through both legs of the upper control arm and through the mounting boss to pivotally attach the upper control arm to the differential case. The lower control arm has two separate attachments to the differential case. A forward branch of the control arm is forked, like the upper control arm, and has a pivot pin extending through the two spaced legs of the fork and through a mounting boss extending laterally from the differential case. The rear branch of a lower control arm has a rear pivot pin extending therethrough that is bolted directly to the side of the differential case. No separate mounting brackets are attached to the differential case for attachment to the control arms.

In addition to the control arms, the suspension includes a hydraulic cylinder that functions as a spring. The hydraulic cylinder is bolted to a mounting boss on the differential case at one end and has an extending rod that is bolted to the lower control arm to carry the suspended tractor mass. By integrating the suspension attachments into the differential case, fewer components are required for the suspension, thus providing the designer with greater flexibility in locating axle components. In addition, greater visibility through the axle to the ground between the tires and the tractor hood is obtained.

DESCRIPTION OF THE PREFERRED EMBODIMENT

Figure 1:
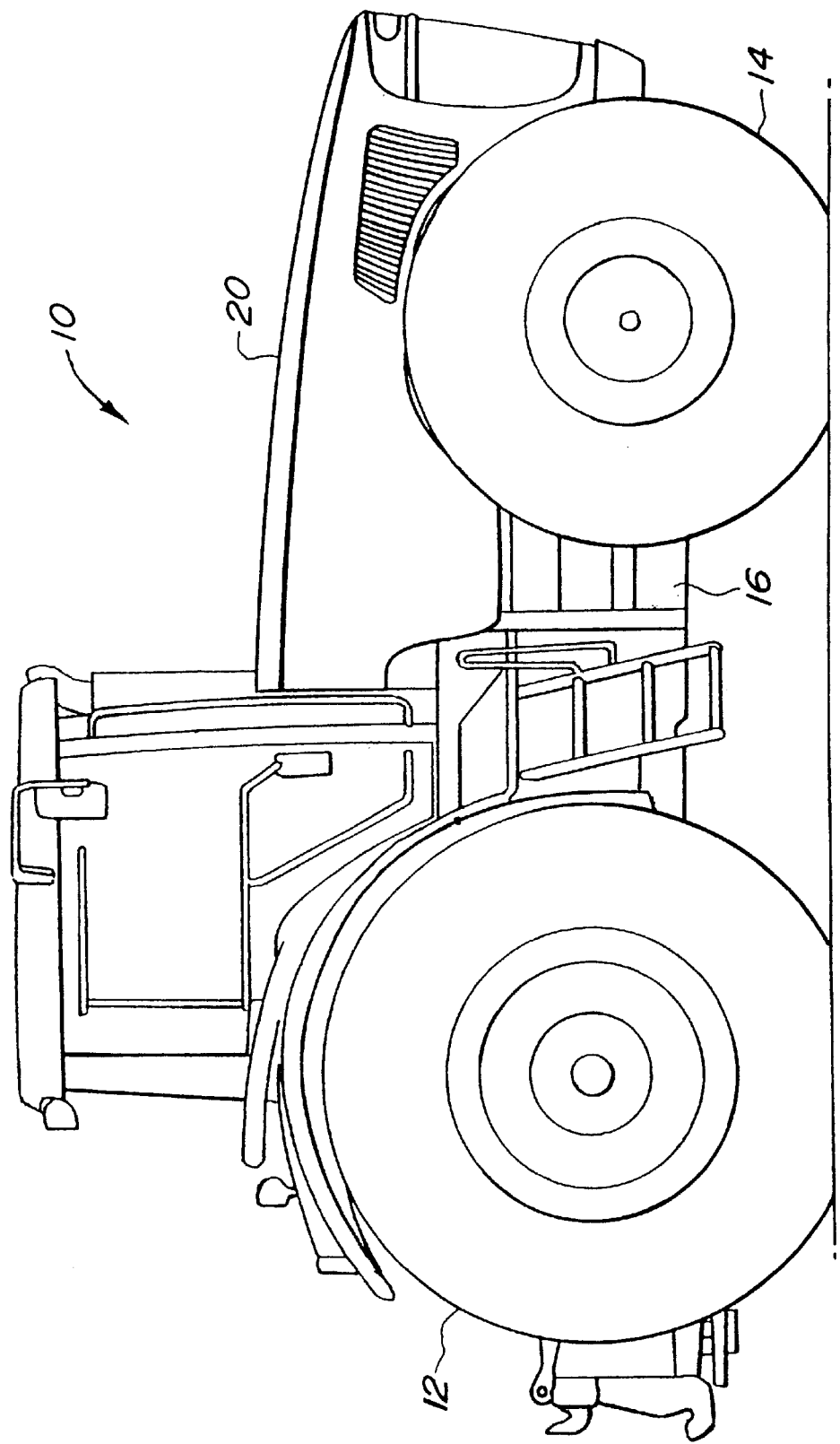
FIG. 1 is a left side view of the tractor of the present invention.

With reference to FIG. 1, a tractor 10 with a front suspension according to the present invention is shown. The tractor 10 includes rear tires 12 and front tires 14. The front tires are steering tires and rotate about upright turning axis described below to steer the vehicle. A chassis 16 supports both the front and rear tires. In the description that follows and the drawings, only the right hand side of the suspension is shown. Both sides are essentially identical in structure.

An engine 18 (FIG. 2) is part of th e chassis and is concealed by the hood 20. The engine 18 includes a cylinder block 22 having a lower end 24. Instead of attaching a conventional oil pan to the bottom of the block 22, the block 22 is attached to a front wheel drive differential case 26. The differential case has a large recess 28 at the upper end that forms a sump 30 (FIG. 3) for engine lubricating oil. The upper face 32 of the differential case surrounds the sump 30 and engages the lower surface of the cylinder block and is bolted thereto by bolts extending through the apertures 34 at the top of the differential case. The arrow 17 designates the forward longitudinal direction or orientation of the differential case.

The differential case 26 is a cast body that is formed with an upper mounting boss 36 extending laterally on each side of the differential case. The upper mounting boss 36 has a central bore 38 therethrough defining an axis 40 extending generally fore and aft of the tractor but not necessarily horizontally.

Figure 2:
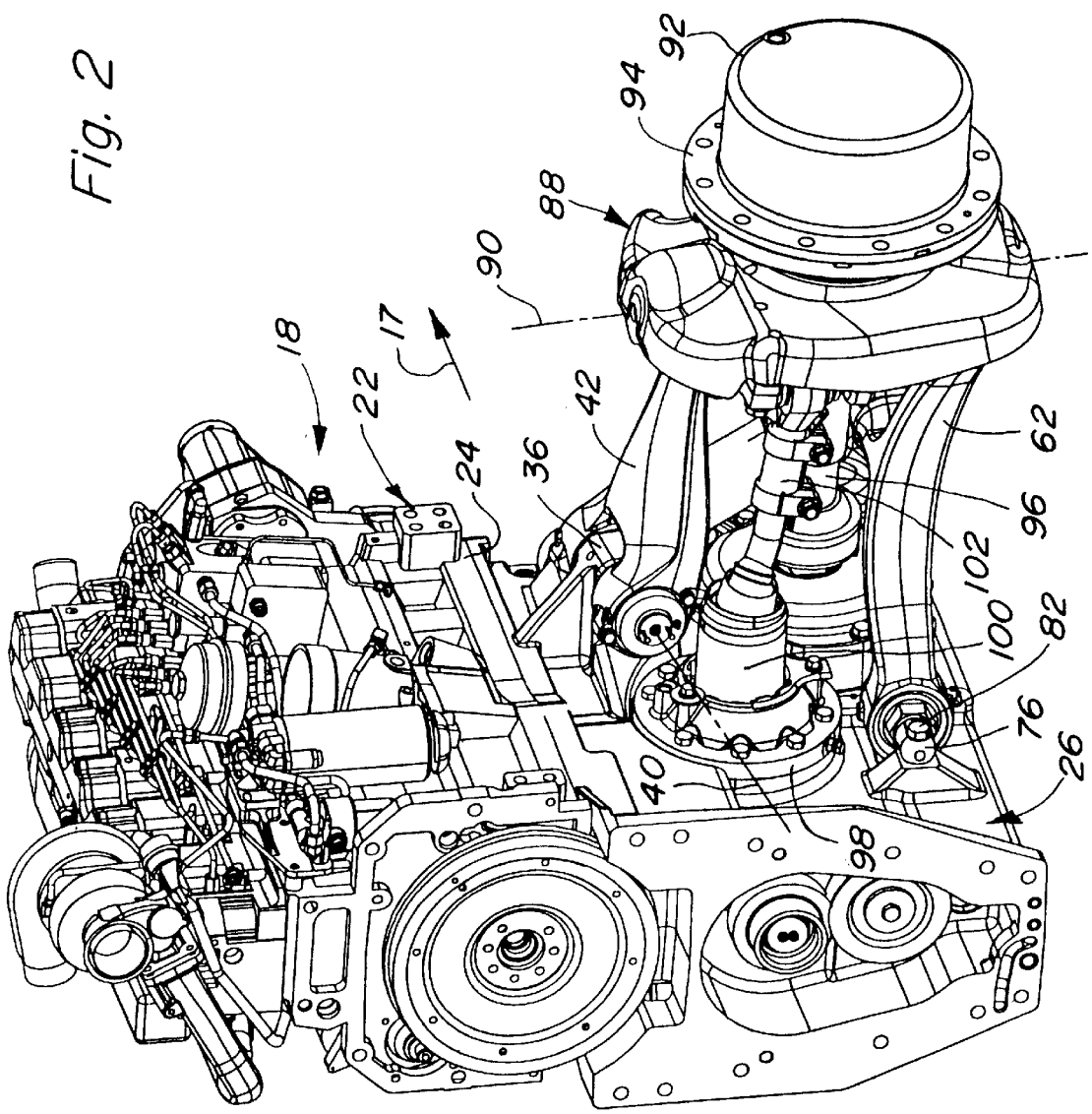
FIG. 2 is a perspective view of the tractor engine, front wheel drive differential case and right front axle.
Figure 3:
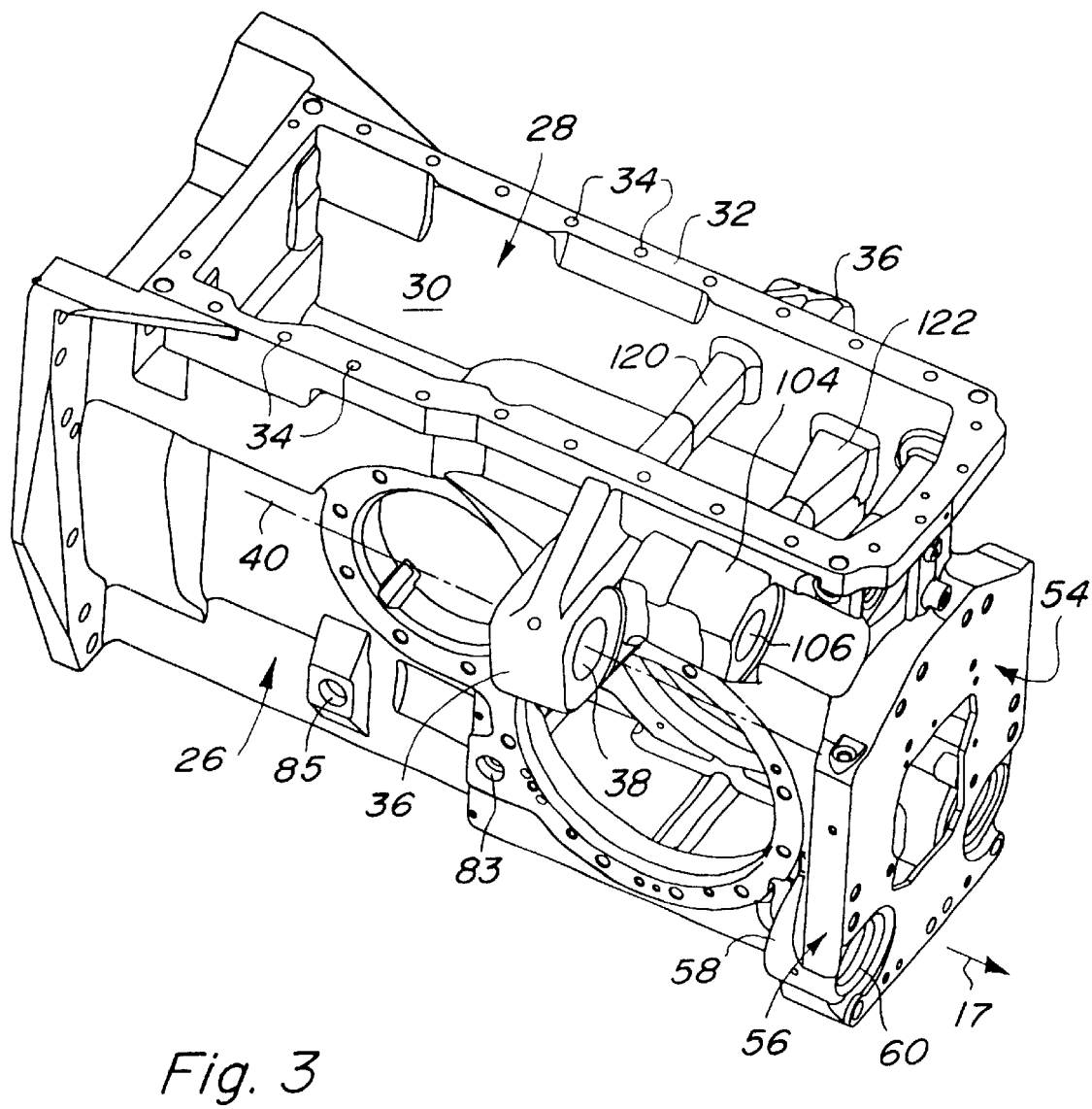
FIG. 3 is a right front perspective view of the front wheel drive differential case.
Figure 4:
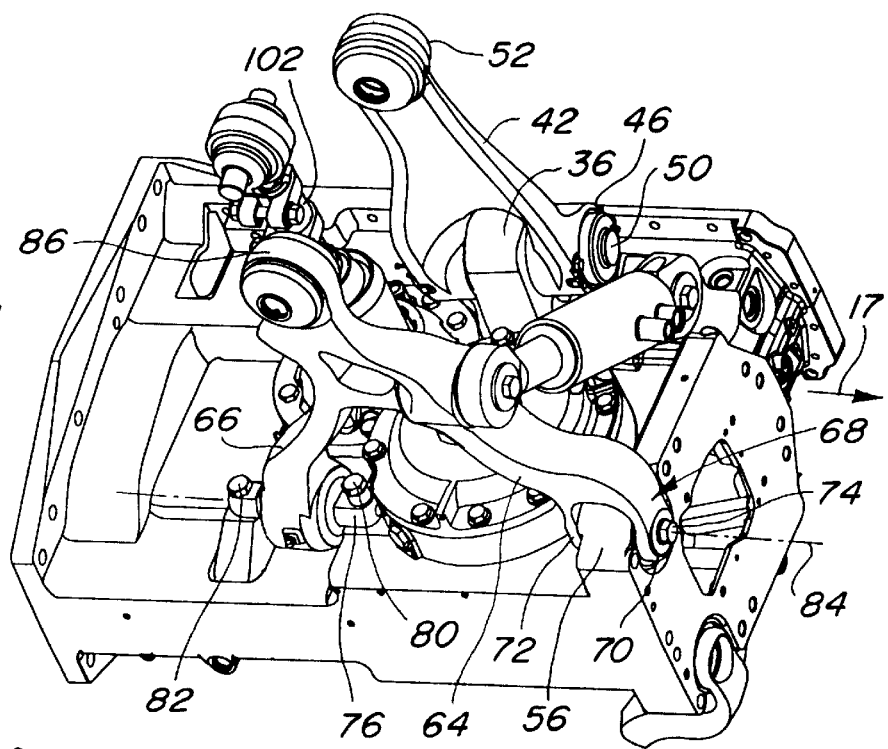
FIG. 4 is a bottom front perspective view of the front wheel drive differential case and right side suspension.
Figure 5:
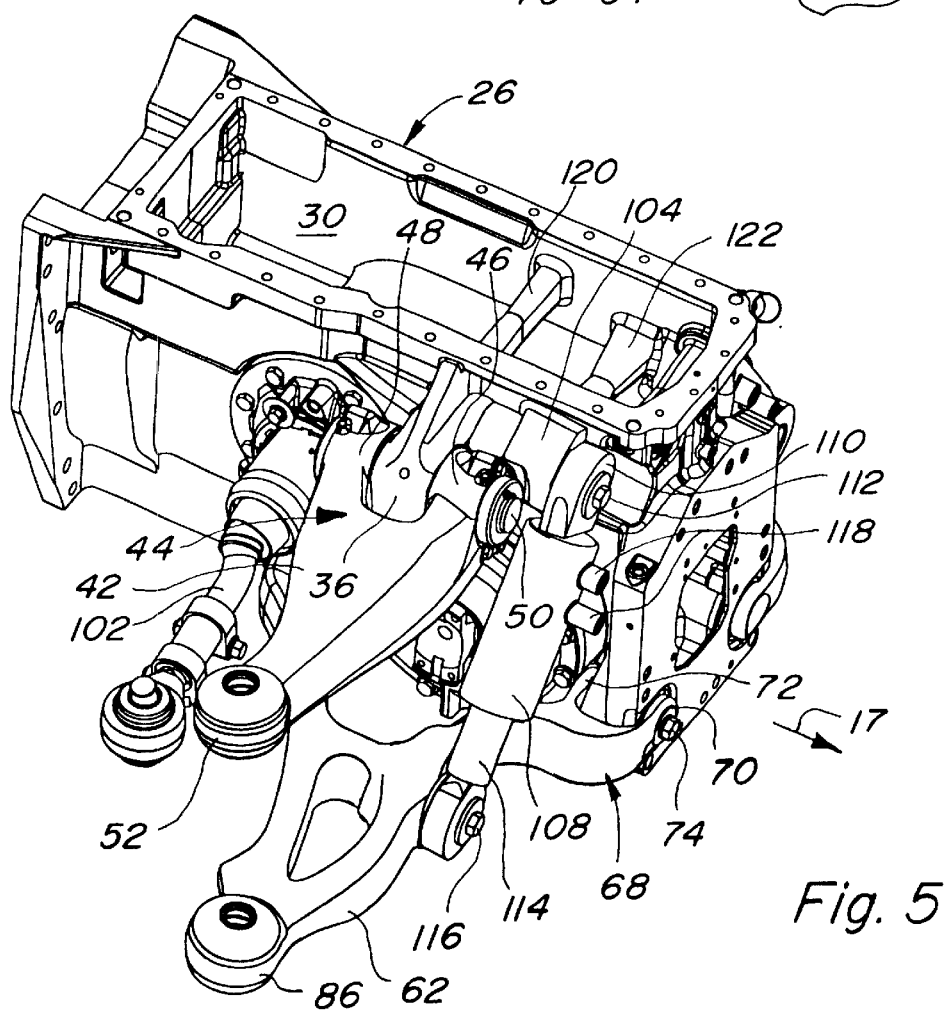
FIG. 5 is a top front perspective view of the front wheel drive differential case and right side suspension.

The upper mounting boss 36 is used to mount an upper suspension control arm 42 shown in FIGS. 2, 4 and 5. The upper control arm 42 has an inboard end portion 44 that is forked, having two spaced apart legs 46 and 48. The legs 46, 48 are disposed on opposite sides of the mounting boss 36 and an upper pivot pin 50 extends through the two legs of the upper control arm and the bore 38 in the upper mounting boss to pivotally attach the upper control arm. The upper control arm thus rotates about the axis 40 to raise and lower the outboard end 52 of the upper control arm.

At the front face 54 of the differential case, a laterally extending flange 56 includes a front lower mounting boss 58; having a through bore 60. A lower control arm 62 is pivotally mounted to the front boss 58. The lower control arm has a front branch 64 and a rear branch 66. The front branch 64 has a forked inboard end portion 68. The forked front branch 64 has legs 70, 72 disposed on opposite sides of the mounting boss 58. A front lower pivot pin 74 extends through the legs 70, 72 and the bore 60 in the mounting boss to pivotally mount the lower control arm.

A rear lower pivot pin 76 extends through a bore in the inboard end of the rear branch 66 and is bolted to the differential case by a pair of bolts 80, 82. The bolts 80, 82 are threaded into apertures 83, 85 respectively in the differential case. The front lower pivot pin 74 and the rear lower pivot pin 76 define a lower pivot axis 84 (FIG. 4) about which the lower control arm 62 rotates to raise and lower the outboard end 86 of the lower control arm.

The outboard ends 52, 86 of the upper and lower control arms are coupled to a steering knuckle 88 through ball joints whereby the steering knuckle 88 can rotate about an upright axis 90 (FIG. 2) to turn the front tires 14. The steering knuckle 88 supports a final drive assembly 92 having a wheel flange 94 to which the wheels supporting the tires 14 are attached. A drive shaft 96 (FIG. 2) extends from the differential case 26 to the final drive assembly for rotating the final drive assembly. The ball joints attaching the steering knuckle to the control arms are disclosed in detail in a co-pending patent application designated by attorney reference number 15286 filed the same date as the present application and hereby incorporated by reference.

The differential case 26 also carries a steering cylinder 98 having an extendable cylinder rod 100. The rod 100 extends laterally outward on both sides of the differential case 26. The steering cylinder rod 100 is coupled to the steering knuckle 88 by a tie rod 102 whereby extension retraction of the rod 100 causes the steering knuckles to rotate about the turning axis 90. The steering cylinder is disclosed in detail in a co-pending patent application Ser. No. 09/661,832 filed the same date as the present application and hereby incorporated by reference.

With reference once again to FIG. 3, the differential case 26 is further formed with a spring mounting boss 104 extending laterally on each side of the differential case. The mounting boss 104 has a bore 106. A hydraulic cylinder 108 has a end portion 110 mounted to the spring boss 104 by a fastener 112. The cylinder 108 has an extendable rod 114 that is coupled to the lower control arm 62 via a fastener 116. The cylinder 108 is in fluid communication with a hydraulic system through ports 118. The hydraulic system includes one or more gas filled accumulators whereby the cylinder 108 functions as a spring for the suspension.

The differential case 26 is reinforced by braces 120 extending across the oil sump 30 between the left and right upper mounting bosses 36. A second brace 122 extends across the sump between the spring mounting bosses 104 on each side. The braces 120, 122 provide improved structural strength to the differential case.

The front suspension control arms and spring member are mounted to the differential case through the integrally formed mounting bosses on the side of the differential case. This reduces the number of components used to attach the suspension system and avoids the need of separate parts bolted to the differential case to which the control arms and spring member are then attached. This provides improved visibility through the axle area, enabling the operator to see the ground and crop row between the front tires 14 and the tractor hood 20. In addition, the elimination of additional components provides free space for packaging other components as necessary. The use of the differential case 26 as a sump for engine lubricating oil eliminates the need for a separate oil pan thereby reducing the vertical height of the tractor hood and/or allowing the front axle crop clearance to be increased.

The invention should not be limited to the above-described embodiment, but should be limited solely by the claims that follow.

We claim:

1. A tractor comprising:
    rear wheels;
    front wheels;
    a chassis to which the front and rear wheels are mounted, the chassis including a cast front wheel drive differential case with front drive shafts extending laterally therefrom on each side to drive the front wheels;
    left and right upper and lower control arms having inboard ends mounted to the chassis for pivotal motion about upper and lower axes respectively for up and down motion of outboard ends of the control arms;
    left and right steering knuckles pivotally attached to the outboard ends of the left and right control arms respectively for pivotal motion about turning axes, the steering knuckles each carrying a final drive assembly driven by the respective drive shaft and to which the front wheels are mounted;
    the cast differential case having an upper mounting boss and a lower mounting boss integrally cast therein to which the upper and lower control arms are attached; and
    wherein the lower control arm has a front and a rear attachment branch at the inboard end thereof, the front branch having a forked end with two spaced legs on opposite sides of the lower mounting boss and a single pivot pin extending through the front branch of the lower control arm and through the lower mounting boss.

2. The tractor as defined by claim 1 wherein the upper and lower mounting bosses define through bores that receive pivot pins attaching the upper and lower control arms to the differential case for pivotal motion.

3. The tractor as defined by claim 1 wherein the upper control arm has a forked inboard end with two spaced legs disposed on opposite sides of the upper mounting boss on the differential case with a single pivot pin extending through the upper control arm and the upper mounting boss.

4. The tractor as defined by claim 1 wherein the lower mounting boss is formed in a laterally extending flange at a front face of the differential case.

5. The tractor as defined by claim 1 wherein the rear attachment branch of the lower control arm has a bore receiving a pivot pin that is bolted to the differential case.

6. The tractor as defined by claim 1 further comprising a spring mounting boss integrally cast in the differential case and a spring member having one end coupled to the differential case through the spring mounting boss and a second end coupled to the lower control arm.

7. The tractor as defined by claim 1 further comprising a steering cylinder carried by the differential case and having a rod extending laterally from the cylinder on both sides, the rod being coupled to the steering knuckles through tie rods on each side whereby lateral movement of the steering cylinder rod turns the steering knuckles.

8. A tractor comprising:

rear wheels;

front wheels;

an engine having an engine block with a lower end;

a chassis to which the front and rear wheels are mounted, the chassis including a cast front wheel drive differential case with front drive shafts extending laterally therefrom on each side to drive the front wheels;

left and right upper and lower control arms having inboard ends mounted to the chassis for pivotal motion about upper and lower axes respectively for up and down motion of outboard ends of the control arms; and left and right steering knuckles pivotally attached to the outboard ends of the left and right control arms respectively for pivotal motion about turning axes, the steering knuckles each carrying a final drive assembly driven by the respective drive shaft and to which the front wheels are mounted;

wherein the cast differential case has an upper mounting boss and a lower mounting boss integrally cast therein to which the upper and lower control arms are attached and the differential case is attached to the lower end of the block and forms an oil sump for engine lubricating oil.

9. A tractor comprising:

rear wheels;

front wheels;

a chassis to which the front and rear wheels are mounted, the chassis including an engine having an engine block and a cast front wheel drive differential case attached to a lower end of the engine block, the differential case forming an oil sump at an upper end thereof for engine lubricating oil;

left and right front drive shafts extending laterally from the differential case to left and right final drive assemblies coupled to the left and right front wheels to drive the front wheels;

left and right upper and lower control arms having inboard ends mounted to the differential case for pivotal motion about upper and lower axes respectively for up and down motion of outboard ends of the control arms; and left and right steering knuckles pivotally attached to the outboard ends of the left and right control arms respectively for pivotal motion about turning axes, the steering knuckles carrying the final drive assemblies.

10. The tractor as defined by claim 9 wherein the differential case is integrally cast with an upper mounting boss forming a bore that receives an upper pivot pin for attaching the upper control arm thereto.

11. The tractor as defined by claim 9 wherein the differential case is integrally cast with a lower front mounting boss forming a bore that receives a lower front pivot pin for attaching the lower control arm thereto.

12. The tractor as defined by claim 11 wherein the differential case has a pair of bolt holes receiving bolts to mount a rear pivot pin for attaching the lower control arm thereto.

13. The tractor as defined by claim 9 further comprising a spring mounting boss integrally cast in the differential case and a spring member having one end coupled to the differential case through the spring mounting boss and a second end coupled to the lower control arm.

14. An agricultural tractor comprising:

front wheels;

an engine having an engine block with a lower end;

an independent suspension assembly carrying the front wheels, the suspension assembly including, for each of left and right sides, upper and lower control arms having inboard and outboard ends, and a spring member operable to absorb energy upon movement of the control arms; and a front-wheel drive differential housing secured to the lower end of the engine block and forming an oil sump for engine lubricating oil wherein the differential housing is a platform for mounting of the inboard ends of the control arms and for mounting the spring member.

* * * * *